W. NOESS.
CHAIN PROTECTOR.
APPLICATION FILED SEPT. 22, 1919.
1,350,234.
Patented Aug. 17, 1920.
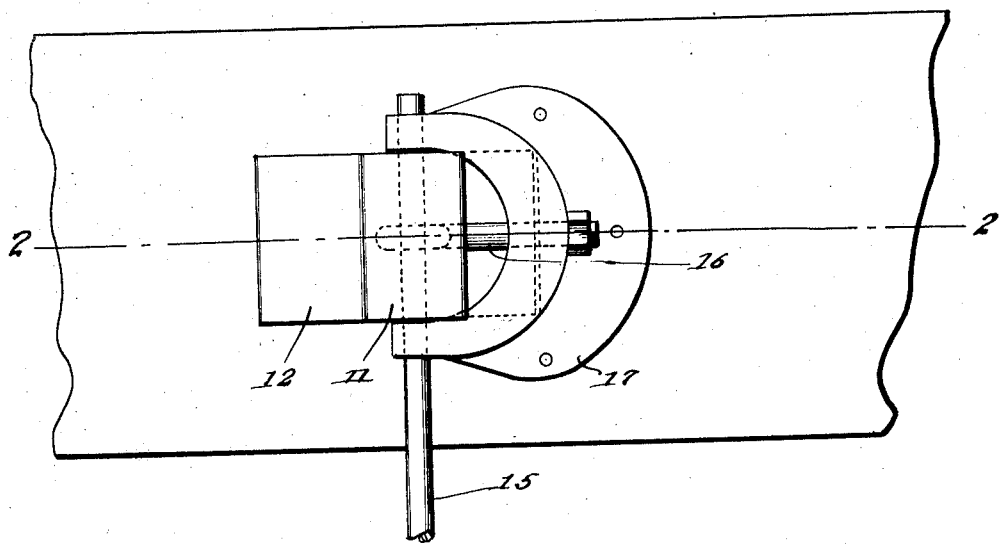
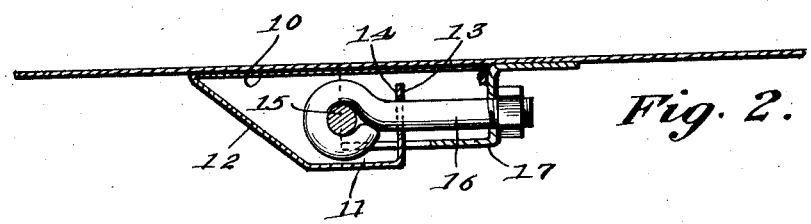
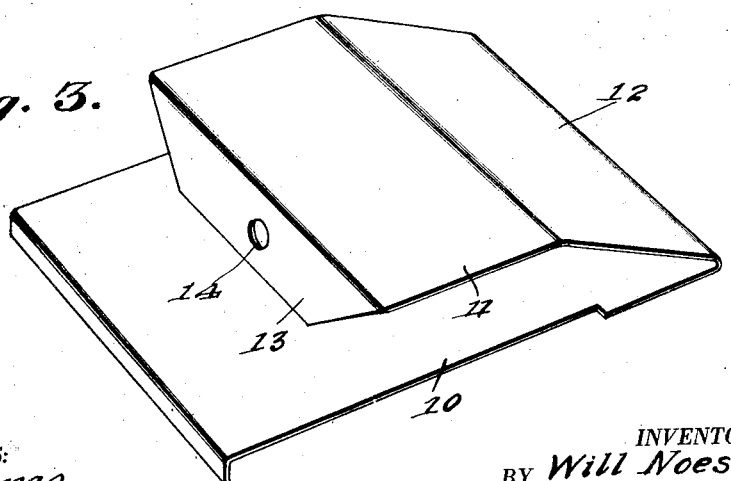
WITNESS:
R. G. Thomas
INVENTOR.
BY Will Noess
Victor J. Evans
ATTORNEY.

UNITED STATES PATENT OFFICE.

WILL NOESS, OF ELLENDALE, NORTH DAKOTA.

CHAIN-PROTECTOR.

1,350,234.          Specification of Letters Patent.    Patented Aug. 17, 1920.

Application filed September 22, 1919. Serial No. 325,289.

*To all whom it may concern:*

Be it known that I, WILL NOESS, a citizen of the United States, residing at Ellendale, in the county of Dickey and State of North Dakota, have invented new and useful Improvements in Chain-Protectors, of which the following is a specification.

This invention relates to attachments for automobiles, and has particular relation to means for preventing anti-skid chains from catching in the fender fastening devices, and is especially designed for use in connection with the well known Ford car.

A further object is the provision of a protector, which is simple in construction, being formed of a single blank of material and easily applied, being carried by the fender fastener in a manner to overlie and protect the latter from contact with the chain.

Other objects and advantages of the invention will appear as the following description is read in connection with the accompanying drawings.

In the drawings:

Figure 1 is a bottom plan view of a fragmentary portion of an automobile fender with the invention applied thereto.

Fig. 2 is a section on the line 2—2 of Fig. 1.

Fig. 3 is a detail perspective view of the protector *per se*.

In automobiles of the Ford type, the fender is secured to a supporting arm by means of a plate, which is carried by the fender and overlies the arm, the latter being engaged by an eye-bolt carried by the plate and through which the supporting arm passes.

When using an automobile anti-skid chain with a car equipped with this type of fender fastener, the said chain frequently catches on the fastener, which either results in a broken chain, or a loose fender.

For the purpose of overcoming this disadvantage, the present invention provides a protector, which is designed to overlie or cover the fender carried plate and the adjacent end of the fender supporting arm. This protector is preferably formed from a single sheet of metal, and is bent to provide substantially parallel walls 10 and 11, the said walls being connected along one edge by means of an inclined portion 12, while at the opposite end of the wall 11 there is provided a right angular flange 13, which is formed with an opening 14.

In adjusting the protector to position, the portion of the fender which includes the wall 10, is inserted above the usual fender supporting arm 15, and above the eye-bolt 16, the shank of the said bolt being passed through the opening 14 and secured in the usual manner to the clamping plate 17.

As will be apparent from Fig. 2 of the drawings, when the protector is in this position, the inclined connecting portion 12 will provide a beveled surface, which will prevent contact of the chain with either the projecting ends of the clamping plate 17 or the eye-bolt 16, so that injury to the chain or fender is prevented.

The invention is susceptible of various changes in its form, proportions and minor details of construction and the right is herein reserved to make such changes as properly fall within the scope of the appended claims.

Having described the invention, what is claimed is:

1. The combination with a vehicle fender including a supporting arm, a clamping plate engageable over said arm and an eye-bolt carried by said plate and engaging said arm, of a protector engageable with the eye-bolt and overlying the clamping plate, said protector including substantially parallel long and short walls, the former bearing upon the fender to provide a firm engaging base and an inclined wall connecting the parallel walls.

2. The combination with a vehicle fender including a supporting arm, a plate engageable over said arm and an eye-bolt carried by said plate and engaging said arm, of a protector formed from a single sheet of metal and bent to provide substantially parallel walls, an inclined portion connecting said walls and a right angularly disposed portion provided with an opening to receive the eye-bolt, whereby the protector will overlie the plate and the eye-bolt.

In testimony whereof I affix my signature.

WILL NOESS.